United States Patent
Kingsley et al.

(10) Patent No.: US 11,061,754 B2
(45) Date of Patent: Jul. 13, 2021

(54) ERROR HANDLING DURING ASYNCHRONOUS PROCESSING OF SEQUENTIAL DATA BLOCKS

(71) Applicant: Alteryx, Inc., Irvine, CA (US)

(72) Inventors: Christopher H. Kingsley, Longmont, CO (US); Edward P. Harding, Jr., Boulder, CO (US)

(73) Assignee: ALTERYX, INC., Irvine, CA (US)

( * ) Notice: Subject to any disclaimer, the term of this patent is extended or adjusted under 35 U.S.C. 154(b) by 91 days.

(21) Appl. No.: 16/533,302

(22) Filed: Aug. 6, 2019

(65) Prior Publication Data

US 2021/0042179 A1 Feb. 11, 2021

(51) Int. Cl.
  *G06F 11/00* (2006.01)
  *G06F 11/07* (2006.01)
  *G06F 9/38* (2018.01)
  *G06F 11/32* (2006.01)

(52) U.S. Cl.
  CPC ........ *G06F 11/0784* (2013.01); *G06F 9/3871* (2013.01); *G06F 11/0751* (2013.01); *G06F 11/0769* (2013.01); *G06F 11/0793* (2013.01); *G06F 11/327* (2013.01)

(58) Field of Classification Search
  CPC ............. G06F 11/0766; G06F 11/0769; G06F 11/0772; G06F 11/0775; G06F 11/0781; G06F 11/0784; G06F 11/321; G06F 11/322; G06F 11/326; G06F 11/327
  USPC ...................................................... 714/1–57
  See application file for complete search history.

(56) References Cited

U.S. PATENT DOCUMENTS

| | | | |
|---|---|---|---|
| 6,115,544 A * | 9/2000 | Mueller | G06F 11/327 714/57 |
| 9,921,857 B1 | 3/2018 | Kaplan et al. | |
| 2008/0281580 A1 | 11/2008 | Zabokritski | |
| 2009/0138861 A1 | 5/2009 | Terpolilli | |
| 2010/0037223 A1 * | 2/2010 | Yorimitsu | G06F 11/0757 718/100 |
| 2010/0205486 A1 | 8/2010 | Chiu et al. | |
| 2010/0325618 A1 * | 12/2010 | Song | G06F 8/43 717/143 |

(Continued)

OTHER PUBLICATIONS

PCT International Search Report and Written Opinion. PCT Application No. PCT/US2020/040245, Sep. 21, 2020, 14 pages.

*Primary Examiner* — Sarai E Butler
(74) *Attorney, Agent, or Firm* — Fenwick & West LLP

(57) ABSTRACT

A data analytics system stores a data file that includes an ordered set of data blocks. The data blocks can be parsed out of order. An error management module of the data analytics system detects a parse error occurring during parsing of a data block and generates an error message for the parse error. The error message includes unresolved location information indicating a location of the detected parse error in the data block. The error management module resolves the unresolved location information after determining that one or more additional data blocks preceding the data block in the ordered set have been parsed. The error management module generates resolved location information that indicates a location of the parse error in the data file. The error management module updates the error message with the resolved location information and outputs the updated error message.

14 Claims, 7 Drawing Sheets

(56) References Cited

U.S. PATENT DOCUMENTS

| | | | | |
|---|---|---|---|---|
| 2014/0122931 A1* | 5/2014 | Devale | ............... | G06F 11/0784 714/37 |
| 2014/0337562 A1* | 11/2014 | Long | ............... | G06F 12/0804 711/103 |
| 2014/0351628 A1* | 11/2014 | Higeta | ............... | G06F 11/1048 714/6.11 |
| 2014/0365828 A1* | 12/2014 | Jiang | ............... | G06F 11/0709 714/37 |
| 2014/0380105 A1* | 12/2014 | Michel | ............... | G06F 11/0709 714/57 |

* cited by examiner

ERROR HANDLING DURING ASYNCHRONOUS PROCESSING OF SEQUENTIAL DATA BLOCKS

BACKGROUND

Field of Art

The described embodiments pertain in general to processing data in a computer system, and in particular to error handling during asynchronous processing of sequential data blocks.

Description of the Related Art

Data analytics involves extracting information having business value from large data sets. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computing platforms.

In addition, efficient data processing techniques are needed to access, process, and analyze the large sets of data from differing data sources. Otherwise, performance bottlenecks can occur and impede the function of the data analytics platform, delay the processing of the data, and reduce the quality of information extracted from the data. For example, error handling is an important consideration. Error handling includes detecting errors, reporting errors to the user, and making recovery strategies. Mishandling of errors detected during the data processing can lead to delays throughout the data analytics platform.

SUMMARY

The above and other issues are addressed by a method, computer-implemented data analytics system, and computer-readable memory for handling errors during asynchronous processing of sequential data blocks in a data analytics system. An embodiment of the method includes parsing a data block of an ordered set of data blocks collectively forming a data file. The method further includes detecting a parse error occurring during the parsing of the data block. The method further includes generating an error message for the detected parse error. The generated error message includes unresolved location information representing a location of the detected parse error in the data file. The method also includes determining whether the unresolved location information can be resolved responsive to parsing of one or more other data blocks in the set. The method further includes in response to a determination that the unresolved location information can be resolved, generating resolved location information indicating the location of the detected parse error in the data file. The method further includes updating the stored error message with the resolved location information to produce an updated error message. The method further includes outputting the updated error message including the resolved location information indicating the location of the detected parse error in the data file.

An embodiment of the computer-implemented data analytics system includes a computer processor for executing computer program instructions. The system also includes a non-transitory computer-readable memory storing computer program instructions executable by the computer processor to perform operations. The operations include parsing a data block of an ordered set of data blocks collectively forming a data file. The operations further include detecting a parse error occurring during the parsing of the data block. The operations further include generating an error message for the detected parse error. The generated error message includes unresolved location information representing a location of the detected parse error in the data file.

The operations also include determining whether the unresolved location information can be resolved responsive to parsing of one or more other data blocks in the set. The operations further include in response to a determination that the unresolved location information can be resolved, generating resolved location information indicating the location of the detected parse error in the data file. The operations further include updating the stored error message with the resolved location information to produce an updated error message. The operations further include outputting the updated error message including the resolved location information indicating the location of the detected parse error in the data file.

An embodiment of the non-transitory computer-readable memory stores executable computer program instructions. The instructions are executable to perform operations. The operations include parsing a data block of an ordered set of data blocks collectively forming a data file. The operations further include detecting a parse error occurring during the parsing of the data block. The operations further include generating an error message for the detected parse error. The generated error message includes unresolved location information representing a location of the detected parse error in the data file. The operations also include determining whether the unresolved location information can be resolved responsive to parsing of one or more other data blocks in the set. The operations further include in response to a determination that the unresolved location information can be resolved, generating resolved location information indicating the location of the detected parse error in the data file. The operations further include updating the stored error message with the resolved location information to produce an updated error message. The operations further include outputting the updated error message including the resolved location information indicating the location of the detected parse error in the data file.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
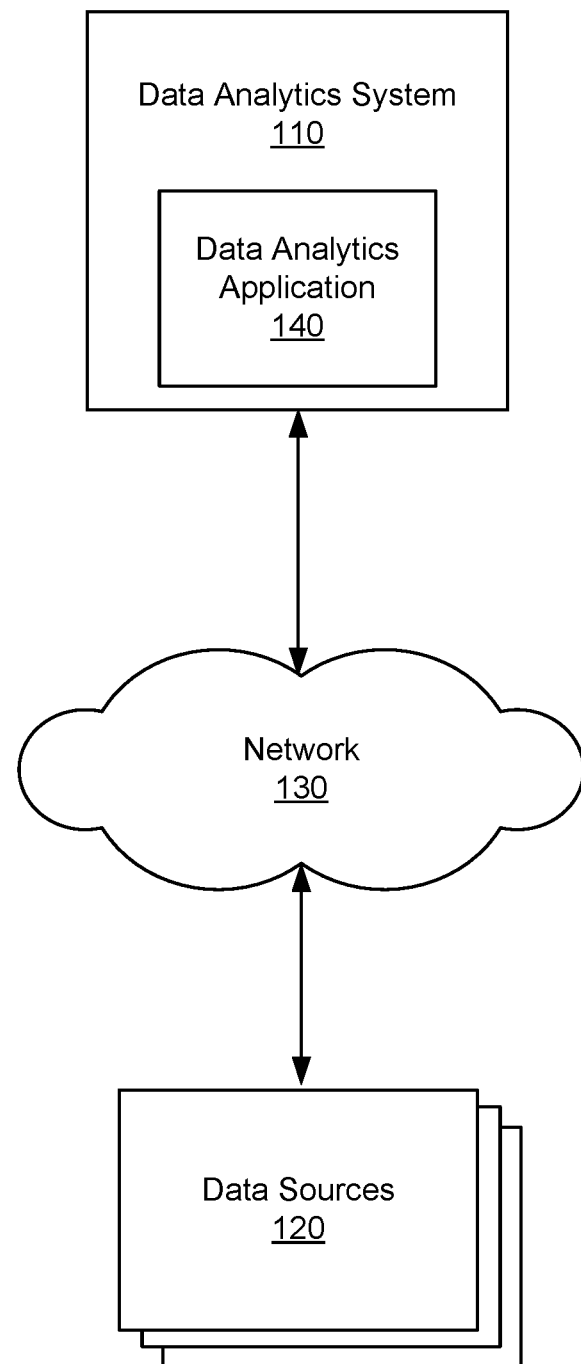
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130.

The data provided by the data sources 120 is typically organized into data records, which each data record including one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with social media applications.

The data analytics system 110 is a computer-based system utilized for processing and analyzing large amounts of data. The data are collected, gathered, or otherwise accessed from the multiple data sources 120 via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows. The data analytics system 110 can be a computing device used to implement data analytics functions including the asynchronous data processing techniques described herein.

The data analytics system 110 can be configured to support one or more software applications, illustrated in FIG. 1 as a data analytics application 140. The data analytics application 140 processes and analyzes large amounts of data obtained from one or more of the data sources 120. In some cases, the data analytics application 140 provides software that supports network, or cloud-based, access to data analytic tools and macros by multiple end users. As an example, the data analytics application 140 allows users to share, browse, and consume analytics in a manner similar to a mobile application store or other cloud-based service.

Analytic data, macros, and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 140 can perform functions associated with analytic apps such as creating, deploying, publishing, iterating, updating, and the like. Additionally, the data analytics application 140 can support functions performed at various stages involved in data analytics, such as the ability to handle errors occurred during data analytics, the ability to access, prepare, blend, analyze, and output analytic results, etc.

The data analytics application 140 can also support a software tool to design and execute repeatable workflows, via a visual graphical user interface (GUI). As an example, a GUI associated with the data analytics application 140 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 3.

In some embodiments, the GUI provides an environment for handling errors. For example, the GUI presents messages of parse errors to an operator. The GUI can also allow the operator to access the messages, edit the messages, analyze the parse errors, fix the parse errors, etc.

The data analytics application 140 reads blocks of data from the data sources 120. For example, the data analytics application 140 may read a data file that includes an ordered set of data blocks from a SSD. Each data block typically includes multiple data records, and the boundaries of the data records are often not aligned with the boundaries of the data blocks. Hence, a data record may span two or more adjacent blocks.

The data analytics application 140 processes each data block to extract data records contained therein. These data records are processed by the data analytics workflow implemented by the data analytics application 140. In one embodiment, the data analytics application 140 asynchronously processes the sequential data blocks using multiple worker threads executing in parallel. As a result, the data blocks may be processed out of order. In some embodiments, the data blocks are delivered to the data analytics application 140 out of order. Worker threads start processing data blocks as they come. Therefore, a data block later in the sequence (e.g., the third data block) may be processed before data blocks earlier in the sequence (e.g., the first and second data blocks).

Asynchronous processing of the data blocks causes challenges in error handling. The data analytics application 140 may detect a parse error during parsing of a data block. Examples of the parse error include unrecognized code, an improper column separator, detecting non-standard characters, insufficient storage for a parse result, incompatibility of the data file, etc. The relative location of the parse error in the data block is known (e.g., the error occurs at the end of the fourth record in the block). However, the absolute location of the parse error in the data file (e.g., the error occurs at the tenth record in the data file) cannot be determined at the time the parse error is detected if there are unparsed data blocks preceding the data block containing the error. The data analytics application 140 therefore cannot output an error message describing the absolute location of the error. The lack of an absolute location makes it difficult for a human operator or automated process to find and remediate the error, causing a delay in the data analytics.

To overcome these and other difficulties, the data analytics application 140 handles errors that occur during asynchronous processing of sequential data block by generating two types of location information for the errors. The data analytics application 140 first generates unresolved location information for a parse error detected during the parsing of a data block for which preceding data blocks have not been processed. The unresolved location information indicates a relative location of the parse error in the data block, such as a line or record number indicating the location of the error in the data block. In some embodiments, the unresolved location information can also include a block number referencing the data block. The data analytics application 140 stores an error message including the unresolved location information in a buffer.

The data analytics application 140 further determines whether the unresolved location information can be resolved by determining whether and/or when the preceding data blocks have been parsed. Once these blocks are parsed, the data analytics application 140 uses the parse results of the preceding data block to generate resolved location information for the parse error. The resolved location information indicates an absolute location of the parse error in the data file, such as a line number or record number referencing a record in the data file where the parse error occurred. The data analytics application 140 outputs an updated error message for the parse error that includes the resolved location information, e.g., to a GUI, module, or file that an operator can access. The error message can also include other information that helps to remediate the error.

The network 130 represents the communication pathways between the data analytics systems 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
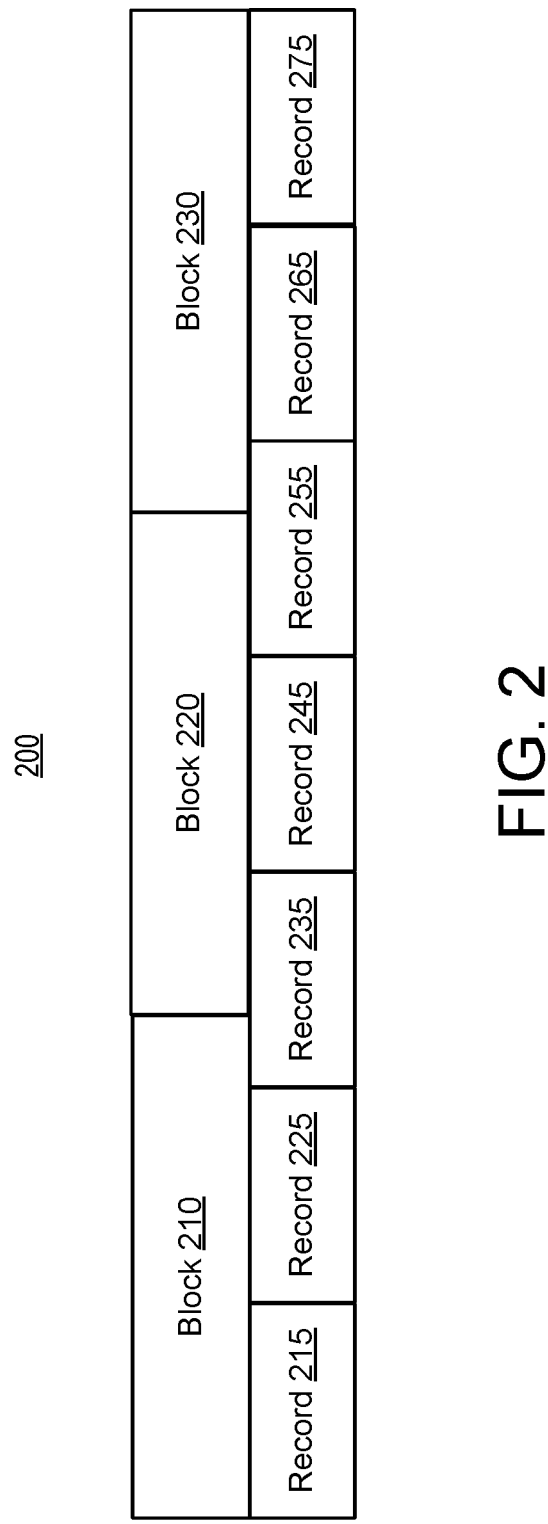
FIG. 2 is a diagram illustrating an example relationship between data blocks and data records.

FIG. 2 is a diagram illustrating an example relationship between data blocks and data records. FIG. 2 illustrates a data file 200 that includes three sequential data blocks 210, 220, and 230 and seven sequential data records, 215, 225, 235, 245, 255, 265, and 275. The data records are not completely aligned with the data blocks. Data block 210 includes all of data records 215 and 225, and a first part of data record 235. Data block 220 includes a second part of data record 235, all of data record 245, and a first part of data record 255. Data block 230 includes a second part of data record 255 and all of data records 265 and 275.

The three sequential data blocks 210, 220, and 230 can be parsed out of order. For example, the data block 230 can be parsed before the data blocks 210 and 220, all of which can be processed in parallel by different worker threads. A parse error may occur during the parsing of the data block 230. For example, a parse error may occur in data record 265. But because the data blocks 210 and 220 have not been processed, their data records and the boundaries of these data records are unknown. Therefore, the absolute location of the parse error in the data file 200 cannot be determined with precision.

Figure 3:
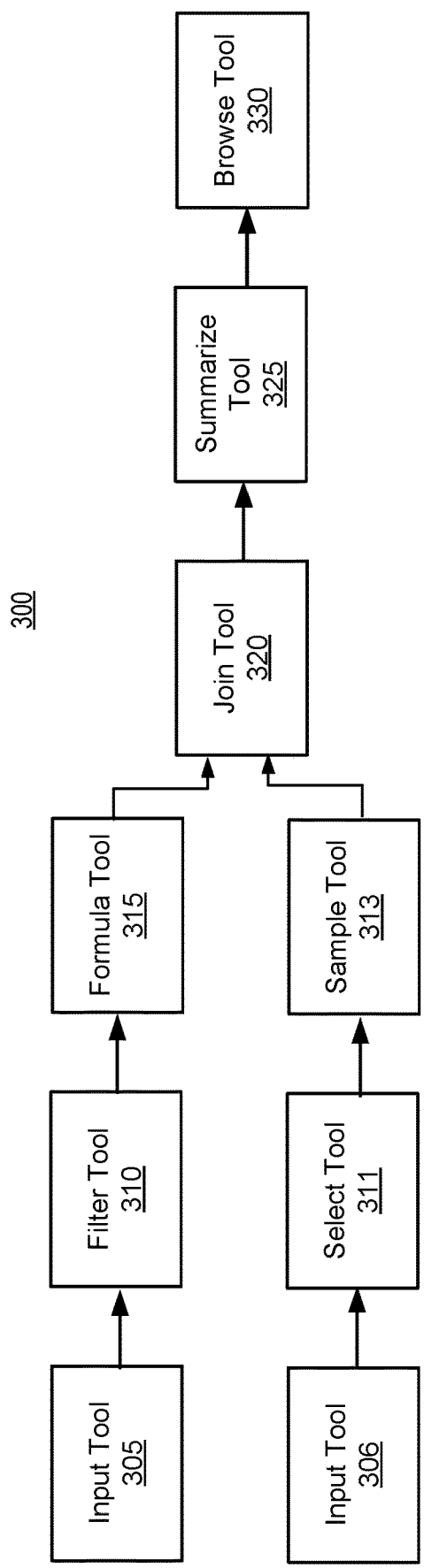
FIG. 3 is a block diagram illustrating a workflow created using the data analytics system to process data according to one embodiment.

FIG. 3 is a block diagram illustrating a workflow 300 created using the data analytics system 110 to process data according to one embodiment. In one embodiment, the workflow 300 is created using a visual workflow environment supported by a GUI of the data analytics system 110. The visual workflow environment enables a set of drag and drop tools that eliminate the need for providing software code to design a workflow and eliminate the need to identify complex formulas to be implemented by the workflow. In another embodiment, the workflow 300 is created and described in a document, such as an extensible markup language (XML) document. The workflow 300 is executed by a computer device of the data analytics system 110. However, in other embodiments, the workflow 300 is deployed to another computer device that may be communicatively connected, via a network (e.g., network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A packet including an aggregated group of individual data records can be passed through the tools of a workflow, which allows for the individual processing operations to operate more efficiently on the data. Such aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools execute in parallel.

As illustrated, the workflow 300 of FIG. 3 includes input/output tools, illustrated as input tools 305 and 306 and a browse tool 330. The input tools 305 and 306 function to access data records from particular data sources 120. The input tools 305 and 306 bring into the workflow the accessed data records and provide the data records to the subsequent tools of the workflow 300. In this example, the input tool 305 provides accessed data records to a filter tool 310 and the input tool 306 provides accessed data records to a select tool 311. The browse tool 330 is located at the end of the workflow 300 and receives the output resulting from the execution of each of the upstream tools of the workflow 300. Although the browse tool 330 is located at the end of the workflow 300 in this example, the browse tool 330 can be added at any point in a workflow to review and verify results from execution of upstream tools of the workflow.

In continuing with the example of FIG. 3, the workflow 300 includes preparation tools, shown as the filter tool 310, the select tool 311, a formula tool 315, and a sample tool 312. The filter tool 310 queries data records based on an expression and splits the data into two streams, a true stream that includes data records that satisfy the expression and a false stream that includes data records that do not satisfy the expression. The select tool 311 can be used to select, deselect, reorder and rename fields, change field type or size, and assign a description. The formula tool 315 creates or updates fields using one or more expressions to perform a broad variety of calculations and/or operations. The sample tool 312 limits a received stream of data records to a number, percentage, or random set of data records. The workflow 300 also includes a join tool 320 that blends multiple data sources. Specifically, the join tool 320 combines two input data streams based on common fields (or data record position).

The workflow 300 of FIG. 3 is also shown to include a summarize tool 325 which is a parse and transform tool that can restructure and re-shape data to a format used in further analysis. The summarize tool 325 can also perform summarization of data by grouping, summing, counting, spatial processing, and string concatenation. In one embodiment, the output generated by the summarize tool 325 contains the results of the calculation(s).

In some embodiments, execution of the workflow 300 will cause the input tool 305 to pass data records one at a time through the filter tool 310 and the formula tool 315, until all data records are processed and have reached the join tool 320. Thereafter, the input tool 306 will begin passing data records one at a time through the select tool 311 and sample tool 312, until the data records are passed to the same join tool 320. Some individual tools of the workflow 300 can possess the capability to implement their own parallel operation, such as initiating a read of a block of data while processing the last block of data or breaking computer-intensive operations, such as a sort tool, into multiple parts. However, in some existing workflow techniques, each data record from a set of data records is individually processed by each tool of the workflow one data record at a time, in a pipeline fashion, until a tool in the workflow is reached that requires multiple data records to perform the processing operation (e.g., sort tool, join tool, summarize tool, etc.)

Errors can occur in the workflow 300. Errors can be caused by flaws associated with the data records, the data sources 120, the computer where the workflow runs, or any combination thereof. An error can be either a fatal error or a non-fatal error. After a fatal error is detected, the workflow 300 may stop until the fatal error is fixed. After a non-fatal error is detected, the workflow 300 may continue and the non-fatal error may be fixed later, e.g., after the workflow 300 is finished.

Figure 4:
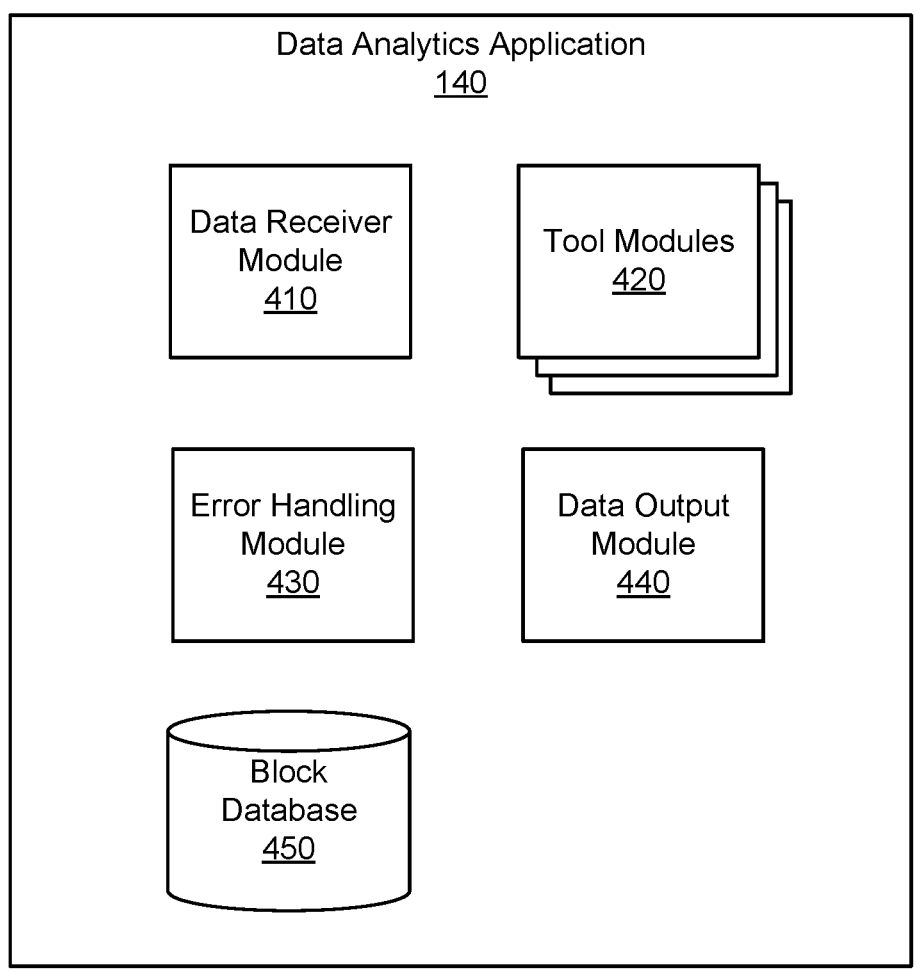
FIG. 4 is a block diagram illustrating a more detailed view of a data analytics application of the data analytics system according to one embodiment.

FIG. 4 is a block diagram illustrating a more detailed view of the data analytics application 140 of the data analytics system 110 according to one embodiment. The data analytics application 140 includes a data receiver module 410, tool modules 420, an error handling module 430, a data output module 440, and a block database 450. Those of skill in the art will recognize that other embodiments can have different and/or other components than the ones described here, and that the functionalities can be distributed among the components in a different manner.

The data receiver module 410 receives data from the data sources 120. In one embodiment, the data receiver module 410 receives data blocks from a data source and parses the data blocks to produce data records. For example, the data receiver module 410 may receive data blocks read from a data file on a SSD, where each data block includes multiple data records, and some data records may span multiple data blocks. The data receiver module 410 passes the data records to the other modules within the data analytics application 140.

The tool modules 420 provide a set of data processing tools that perform specific processing operations or data analytics functions including one or more of the following: input/output; preparation; join; predictive; spatial; investigation; and parse and transform operations. The tools operate on the data records received from the data sources 120 by the data receiver module 410. The operation on the data records can be asynchronous. The tool modules 420 provide the tools included in the workflow 300 described in conjunction with FIG. 3.

The error handling module 430 handles errors that occur during asynchronous processing of data records in sequential data blocks by the tool modules 420 or during other processing. The error handling module 430 detects parse errors that occur during parsing of the data records. The error handling module 430 generates an error message for a detected parse error. The error message initially includes unresolved location information of the parse error that indicates a relative location of the parse error in the data block. The relative location can include a relative line number that indicates location of the line where the parse error occurs in the data block, or a relative record number that indicates location of the data record where the parse error occurs in the data block. The error handling module 430 stores the error message with the unresolved location information and waits until other data blocks that precede the data block in the ordered set (hereinafter referred as "preceding data blocks") have been parsed. Once the preceding data blocks are parsed, the error handling module 130 resolves the location information to produce resolved error information indicating the absolute location of the error in the data file.

The error handling module 430 can determine whether the preceding data blocks have been parsed by determining whether the data block is lowest numbered data block in the sequence for which parsing has not been completed. In some embodiments, the error handling module 430 determines that the data block is the lowest numbered data block in the sequence for which parsing has not been completed, e.g., based on information in a buffer. The buffer stores information indicating which data blocks are being processed or have yet to be processed. In one example, the buffer stores status indicators for a subset of the sequential data blocks. A status indicator indicates whether the corresponding data block has been parsed. The group of active data blocks is a subset of the sequential data blocks. The lowest numbered active data block is the lowest numbered data block in the sequence for which parsing has not been completed.

The error handling module 430 can resolve the unresolved location information based on result of the parsing of the preceding data blocks. In some embodiments, the error handling module 430 uses data records produced during the parsing of the preceding data blocks to determine a record number referencing the data record where the parse error occurred and generates resolved location information based on the record number. The error handling module 430 updates the error message with the resolved location information to produce an updated error message. In some embodiments, the error handling module 430 replaces the unresolved location information in the error message with the resolved location information. The error handling module 430 outputs the updated error message so that the updated error message can be accessed by an operator.

The data output module 440 outputs the results of the processing performed by the data analytics application 140. That is, the data output module 440 receives the processed data records produced by execution of the workflow 200 and makes the data records available to other systems and/or human reviewers. For example, the data output module 440 may provide a GUI by which a human reviewer associated with an enterprise can review the output of the workflow 200 resulting from processing data records associated with the enterprise.

Figure 5:
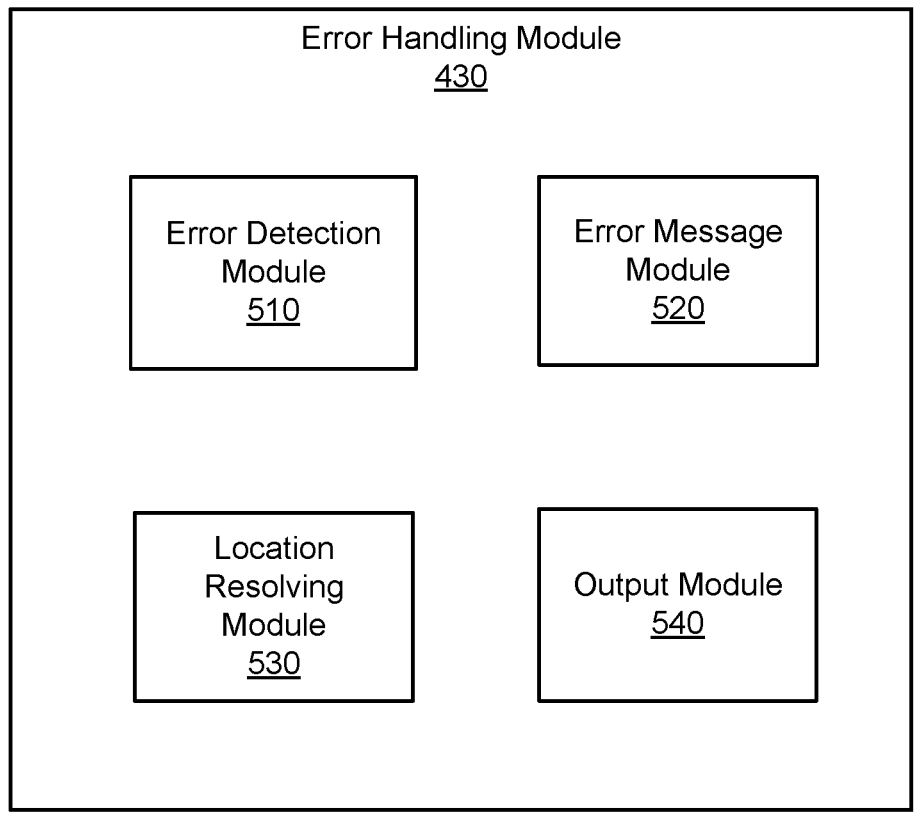
FIG. 5 is a block diagram illustrating a more detailed view of an error management module of the data analytics application according to one embodiment.

FIG. 5 is a block diagram illustrating a more detailed view of the error handling module 430 of the data analytics application 140 according to one embodiment. The error handling module 430 includes an error detection module 510, an error message module 520, a location resolving module 530, and an output module 540. Those of skill in the art will recognize that other embodiments can have different and/or other components than the ones described here, and that the functionalities can be distributed among the components in a different manner.

The error detection module 510 detects a parse error that occurs during parsing of a data block ("target data block"). The target data block is a part of a data file (e.g., a comma-separated values file) that includes a set of sequential data blocks collectively holding a set of sequential records. The sequential data blocks can be parsed out of order. Thus, a given data block can be parsed before a preceding data block is parsed or at the same time a preceding data block is being parsed. The error detection module 510 detects the parse error by detecting that the worker thread parsing the data block encounters a data record or other data that fails to conform with a predefined schema and/or contains another deviation from an expected arrangement of data.

The error message module 520 generates an error message for the detected parse error that includes unresolved location information for the detected parse error. The unresolved location information indicates a location of the parse error in the target data block. The unresolved location information can include a line number referencing a line in the target data block containing the data record having the error and/or otherwise describe the location of the data record within the target data block.

In addition to the unresolved location information, the error message can also include other information describing the parse error (e.g., information explaining the cause of the parse error, etc.) and information for fixing the error (e.g., recovery strategy, recommendations of methods to fix the parse error, etc.). In some embodiments, the error message includes a warning of the parse error. The error message module 520 stores the error message.

The location resolving module 530 resolves the unresolved location information in the error message to produce an updated error message. The location resolving module 530 may not resolve the unresolved location information in the error message until parsing of the target data block is completed.

In some embodiments, the location resolving module 530 determines whether the unresolved location information can be resolved by determining whether the preceding data blocks have been parsed. In some embodiments, the location resolving module 530 uses information in a buffer to determine whether the preceding data blocks have been parsed. An example of the buffer is a circular buffer. The buffer can store the error messages generated by the error message module 520. It can also store status indicators of data blocks. A status indicator of a data block indicates whether the data block has been parsed. In one embodiment, the status indicator of a data block that has been parsed is the number of records known to be in the data block, and the status indicator of a data block that has not been parsed is −1. In one example, the buffer stores status indicators only for active data blocks. Active data blocks include data blocks in a portion of the sequence. The portion of the sequence starts with the lowest numbered data block in the sequence for which parsing has not been completed. In other words, all the data blocks preceding the first active data block have been parsed. For instance, a data file includes 100 data blocks ordered in a sequence. The first 36 data blocks have been parsed but the $37^{th}$ data block has not been parsed. The $37^{th}$ data block is the lowest numbered data block in the sequence for which parsing has not been completed. After a data block becomes inactive, its status indicator can be removed from the buffer to save memory usage. For instance, if parsing of the $37^{th}$ data bock is completed and the $38^{th}$ data block has already been parsed, the $39^{th}$ data block, assuming not parsed yet, becomes the lowest numbered data block in the sequence for which parsing has not been completed. The status indicators of the $37^{th}$ and $38^{th}$ data blocks will be removed from the buffer.

The local resolving module 530 can determine whether the target data block is the first active data block (i.e., the lowest numbered data block in the sequence for which parsing has not been completed). In response to a determination that the target data block is the first active data block, the local resolving module 530 determines that the preceding data blocks have been parsed and that the unresolved location information can be resolved. Otherwise, the local resolving module 530 determines that the preceding data blocks have not been parsed and that the unresolved location information cannot be resolved.

The active data blocks may end with the highest numbered data block in the sequence for which parsing has started. For instance, parsing of the $45^{th}$ data block of the data file including 100 data blocks has started. But parsing of the $46^{th}$-$100^{th}$ data blocks have not started. The $45^{th}$ data block is therefore the highest numbered data block in the sequence for which parsing has started. Accordingly, the $37^{th}$-$45^{th}$ data blocks are the active data blocks and the buffer stores status indicators for the $37^{th}$-$45^{th}$ data blocks.

In response to a determination that the unresolved location information can be resolved, the local resolving module 530 generates resolved location information for the parse error and updates the stored error message to include the resolved location information. The resolved location information can be, e.g., a line number referencing a location of the line where the parse error occurs in the data file, or a record number referencing a location of the record where the parse error occurs in the data file. In some embodiments, the local resolving module 530 generates the resolved location information based on a combination of the unresolved location information and information produced by the parsing of the preceding blocks. For example, if the parsing indicated that the preceding blocks contained 50 records, and the unresolved location information indicates an error in the third record of the block, the local resolving module may generate resolved location information indicating that the error is in the 53$^{rd}$ record of the data file.

The output module 540 outputs the updated error message. In some embodiments, the output module 540 transmits the updated error message from the data analytics system to a module, GUI, display, or file that an operator has access to. The output module 540 may remove the updated error message from the buffer after outputting the updated error message. In some embodiments, the output module 540 outputs the updated error message once the updated error message is generated. In some embodiments, the output module 540 holds on outputting the updated error message until other error messages are generated. The output module 540 can output error messages of other errors detected during parsing of the data block and/or error messages of errors detected during parsing of the preceding data blocks together with the updated error message. In some embodiments, the output module 540 receives a record number cap that indicates a number of data records for which error messages are to be outputted. The output module 540 outputs error messages for the first number of data records in data file. The output module 540 may remove error messages that are not to be outputted.

Figure 6:
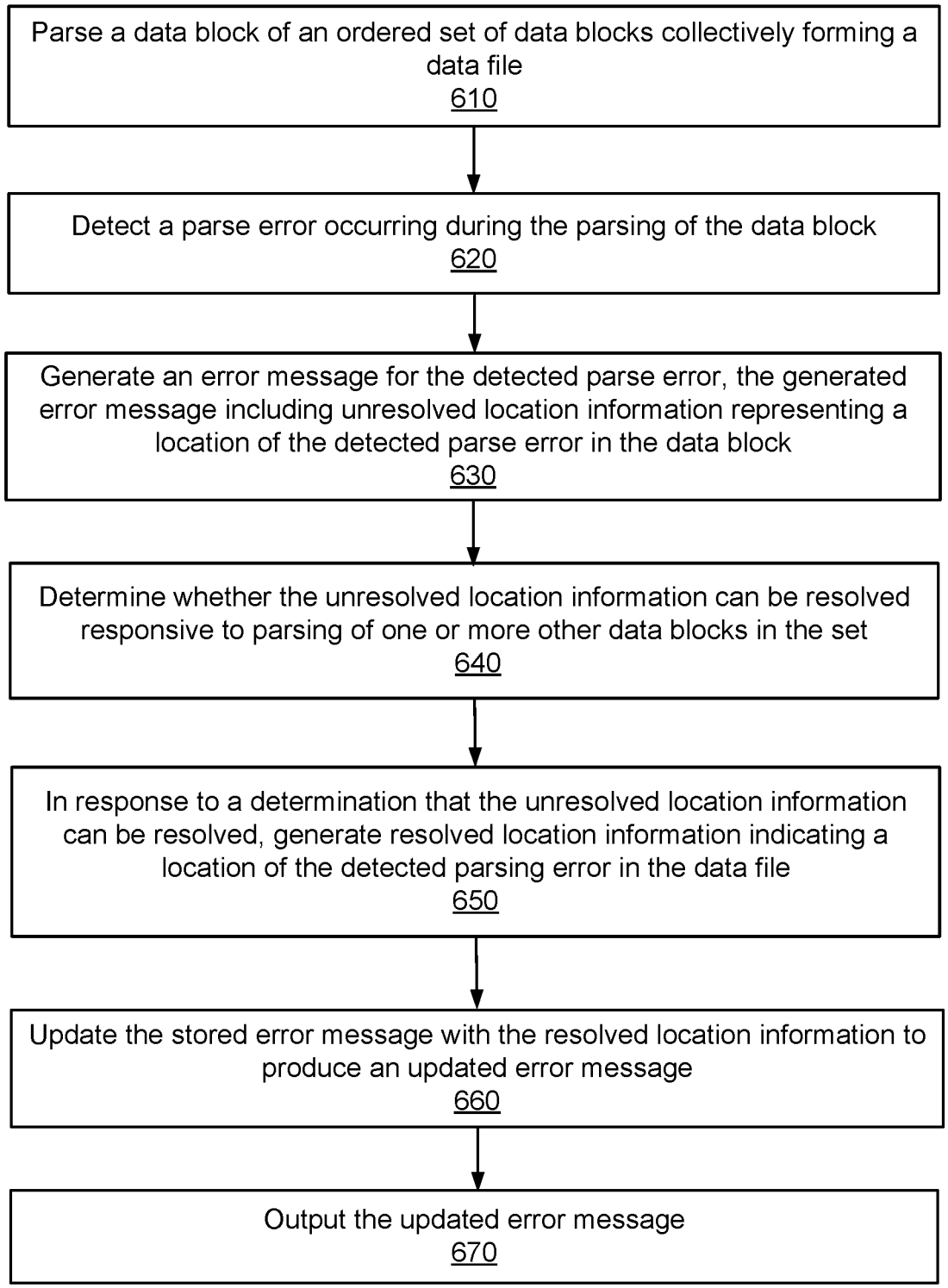
FIG. 6 is a flow chart illustrating a method of managing errors detected during processing of data blocks according to one embodiment.

FIG. 6 is a flow chart illustrating a method of error handling during asynchronous processing of sequential data blocks according to one embodiment. In some embodiments, the method is performed by the data analytics application 140, although some or all of the operations in the method may be performed by other entities in other embodiments. In some embodiments, the operations in the flow chart are performed in different orders and include different and/or additional steps.

The data analytics application 140 parses 610 a data block of an ordered set of data blocks collectively forming a data file. For example, the data analytics application 140 uses a worker thread to parse the data block to produce data records. In some embodiments, the data analytics application 140 uses multiple worker threads executing in parallel to simultaneously parse multiple data blocks in the ordered set. The worker threads may parse the data blocks out of order. For example, the first and second data blocks may be parsed after the third data block. Each data block typically includes multiple data records, and the boundaries of the data records are often not aligned with the boundaries of the data blocks.

The data analytics application 140 detects 620 a parse error occurring during the parsing of the data block. In one embodiment, the parse error may be a fatal error, in which case the parsing of the data blocks stops after the parse error is detected. In another embodiment, the parse error may be a non-fatal error, in which case the parsing of the data blocks continues after the parse error is detected.

The data analytics application 140 generates 630 an error message for the detected parse error. The generated error message includes unresolved location information representing a relative location of the detected parse error in the data file, e.g., indicating the location of the detected parse error in the data block.

The data analytics application 140 determines 640 whether the unresolved location information can be resolved responsive to parsing of one or more other data blocks in the set. The data analytics application 140 makes the determination by determining whether one or more additional data blocks preceding the data block in the ordered set (i.e., one or more preceding data blocks) have been parsed. In some embodiments, the data analytics application 140 determines whether the data block is the lowest numbered data block in the ordered set for which parsing has not been completed. In response to a determination that the data block is the lowest numbered data block in the ordered set for which parsing has not been completed, the data analytics application 140 determines 640 that the unresolved location information can be resolved.

In response to a determination that the unresolved location information can be resolved, the data analytics application 140 generates 650 resolved location information indicating an absolute location of the detected parse error in the data file. In some embodiments, the resolved location information includes a record number of the detected parse error. The record number references location of a data record in the ordered set where the detected parse error occurs. The data analytics application 140 can determine the record number based on the unresolved location information, result of the parsing of the data block, result of the parsing of the one or more preceding data block, or some combination thereof.

The data analytics application 140 updates 660 the stored error message with the resolved location information to produce an updated error message and outputs 670 the updated error message. The updated message includes the resolved location information indicating the location of the detected parse error in the data file. In some embodiments, the data analytics application 140 also outputs other error messages for errors detected during parsing of one or more other data blocks preceding the data block in the ordered set. In some embodiments, the data analytics application 140 receive a record number cap from a user. The record number cap indicates a number of data records for which error messages are to be output. The data analytics application 140 outputs error messages for the first number of data records in the ordered set.

Figure 7:
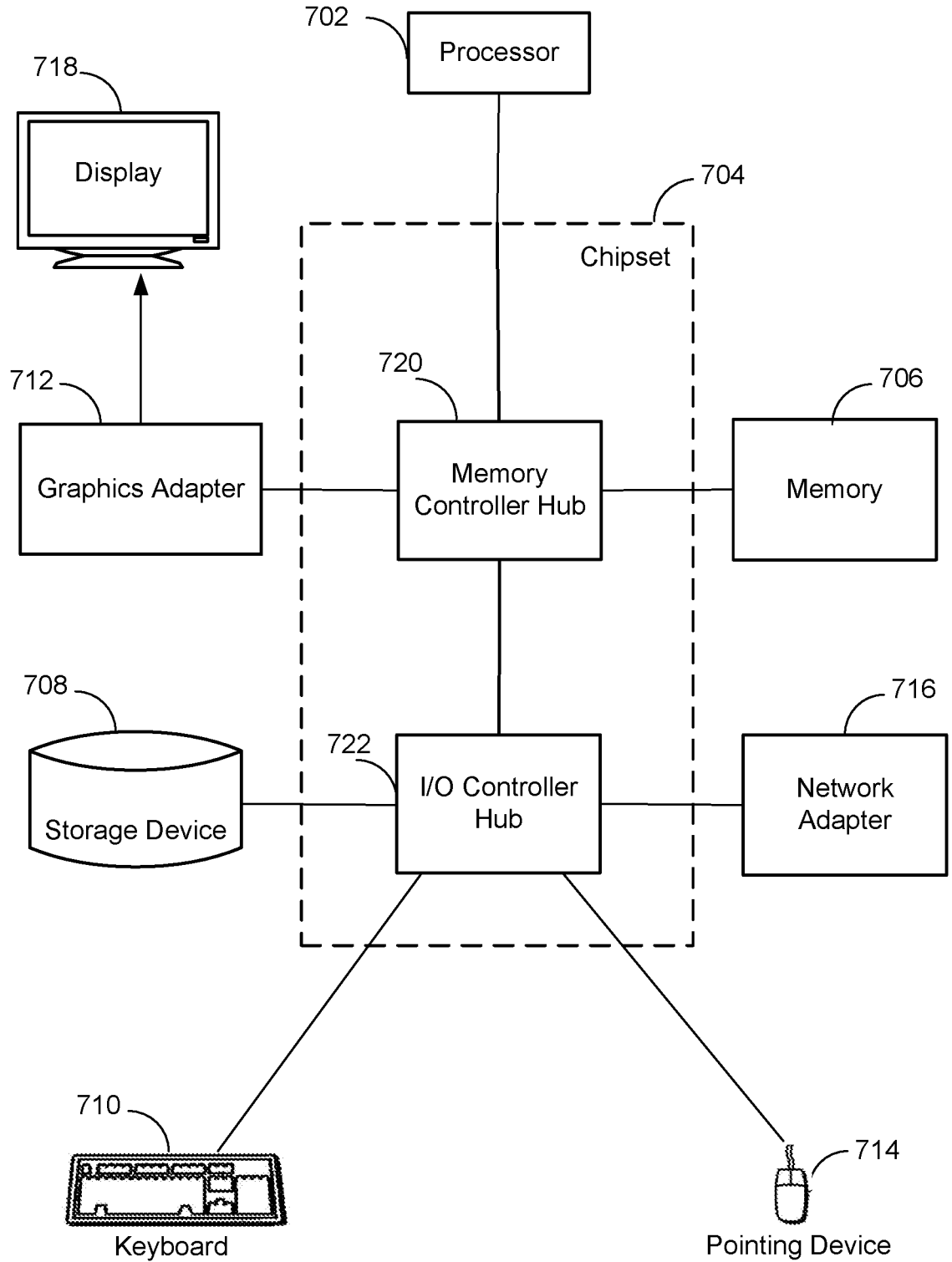
FIG. 7 is a high-level block diagram illustrating a functional view of a typical computer system for use as a data analytics system according to an embodiment.

FIG. 7 is a high-level block diagram illustrating a functional view of a typical computer system 700 for use as the data analytics system 110 of FIG. 1 according to an embodiment. The computer system 700 can execute the data analytics application 140 to implement the workflow of FIG. 3.

The illustrated computer system includes at least one processor 702 coupled to a chipset 704. The processor 702 can include multiple processor cores on the same die. The chipset 704 includes a memory controller hub 720 and an input/output (I/O) controller hub 722. A memory 706 and a graphics adapter 712 are coupled to the memory controller hub 720 and a display 718 is coupled to the graphics adapter 712. A storage device 708, keyboard 710, pointing device 714, and network adapter 716 may be coupled to the I/O controller hub 722. In some other embodiments, the computer system 700 may have additional, fewer, or different components and the components may be coupled differently. For example, embodiments of the computer system 700 may lack displays and/or keyboards. In addition, the computer system 700 may be instantiated as a rack-mounted blade server or as a cloud server instance in some embodiments.

The memory 706 holds instructions and data used by the processor 702. In some embodiments, the memory 706 is a random-access memory. The storage device 708 is a non-transitory computer-readable storage medium. The storage device 708 can be a HDD, SSD, or other types of non-transitory computer-readable storage medium. Data processed and analyzed by the data analytics system 110 can be stored in the memory 706 and/or the storage device 708.

The pointing device 714 may be a mouse, track ball, or other type of pointing device, and is used in combination with the keyboard 710 to input data into the computer system 700. The graphics adapter 712 displays images and other information on the display 718. In some embodiments, the display 718 includes a touch screen capability for receiving user input and selections. The network adapter 716 couples the computer system 700 to the network 170.

The computer system 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method comprising:
parsing a data block of a data file, the data file comprising a sequence of data blocks that include the data block and one or more preceding data blocks that precede the data block in the sequence, wherein the parsing of the data block occurs before parsing of the one or more preceding data blocks;
detecting a parse error occurring during the parsing of the data block;
generating an error message for the detected parse error, the generated error message including unresolved location information indicating a location of the detected parse error in the data block;
determining whether the one or more preceding data blocks have been parsed;
in response to a determination that the one or more preceding data blocks have been parsed, generating resolved location information indicating the location of the detected parse error in the data file;
updating the stored error message with the resolved location information to produce an updated error message; and
outputting the updated error message including the resolved location information indicating the location of the detected parse error in the data file.

2. The method of claim 1, wherein generating an error message for the detected parse error, the generated error message including unresolved location information representing a location of the detected parse error in the data block comprises:
determining a line number referencing a line in the data block where the detected parse error occurs.

3. The method of claim 1, wherein determining whether the one or more preceding data blocks have been parsed comprises:
determining whether the data block is a lowest numbered data block in the sequence for which parsing has not been completed.

4. The method of claim 1, wherein generating the resolved location information indicating the location of the detected parse error in the data file comprises:
generating the resolved location information based on the unresolved location information, result of the parsing of the data block, and result of the parsing of the one or more preceding data blocks.

5. The method of claim 1, wherein outputting the updated error message including the resolved location information indicating the location of the detected parse error in the data file comprises:
outputting the updated error message and one or more other error messages for errors detected during parsing of one or more additional data blocks preceding the data block in the sequence.

6. A non-transitory computer-readable memory storing executable computer program instructions, the instructions executable to perform operations comprising:
parsing a data block of a data file, the data file comprising a sequence of data blocks that include the data block and one or more preceding data blocks that precede the data block in the sequence, wherein the parsing of the data block occurs before parsing of the one or more preceding data blocks;
detecting a parse error occurring during the parsing of the data block;
generating an error message for the detected parse error, the generated error message including unresolved location information indicating a location of the detected parse error in the data block;
determining whether the one or more preceding data blocks have been parsed;

in response to a determination that the one or more preceding data blocks have been parsed, generating resolved location information indicating the location of the detected parse error in the data file;

updating the stored error message with the resolved location information to produce an updated error message; and outputting the updated error message including the resolved location information indicating the location of the detected parse error in the data file.

7. The non-transitory computer-readable memory of claim 6, wherein generating an error message for the detected parse error, the generated error message including unresolved location information representing a location of the detected parse error in the data block comprises:

determining a line number referencing a line in the data block where the detected parse error occurs.

8. The non-transitory computer-readable memory of claim 6, wherein determining whether the one or more preceding data blocks have been parsed comprises:

determining whether the data block is a lowest numbered data block in the sequence for which parsing has not been completed.

9. The non-transitory computer-readable memory of claim 6, wherein generating the resolved location information indicating the location of the detected parse error in the data file comprises:

generating the resolved location information based on the unresolved location information, result of the parsing of the data block, and result of the parsing of the one or more preceding data blocks.

10. The non-transitory computer-readable memory of claim 6, wherein outputting the updated error message including the resolved location information indicating the location of the detected parse error in the data file comprises:

outputting the updated error message and one or more other error messages for errors detected during parsing of one or more additional data blocks preceding the data block in the sequence.

11. A computer-implemented data analytics system for processing data blocks, comprising:

a computer processor for executing computer program instructions; and a non-transitory computer-readable memory storing computer program instructions executable by the computer processor to perform operations comprising:

parsing a data block of a data file, the data file comprising a sequence of data blocks that include the data block and one or more preceding data blocks that precede the data block in the sequence, wherein the parsing of the data block occurs before parsing of the one or more preceding data blocks;

detecting a parse error occurring during the parsing of the data block;

generating an error message for the detected parse error, the generated error message including unresolved location information indicating a location of the detected parse error in the data block;

determining whether the one or more preceding data blocks have been parsed;

in response to a determination that the one or more preceding data blocks have been parsed, generating resolved location information indicating the location of the detected parse error in the data file;

updating the stored error message with the resolved location information to produce an updated error message; and outputting the updated error message including the resolved location information indicating the location of the detected parse error in the data file.

12. The system of claim 11, wherein generating an error message for the detected parse error, the generated error message including unresolved location information representing a location of the detected parse error in the data block comprises:

determining a line number referencing a line in the data block where the detected parse error occurs.

13. The system of claim 11, wherein determining whether the one or more preceding data blocks have been parsed comprises:

determining whether the data block is a lowest numbered data block in the sequence for which parsing has not been completed.

14. The system of claim 11, wherein generating the resolved location information indicating the location of the detected parse error in the data file comprises:

generating the resolved location information based on the unresolved location information, result of the parsing of the data block, and result of the parsing of the one or more preceding data blocks.

\* \* \* \* \*